(12) United States Patent
Dasgupta et al.

(10) Patent No.: US 11,113,366 B2
(45) Date of Patent: Sep. 7, 2021

(54) CRYPTOGRAPHIC MECHANISMS FOR SOFTWARE SETUP USING TOKEN-BASED TWO-FACTOR AUTHENTICATION

(71) Applicant: Infosys Limited, Bangalore (IN)

(72) Inventors: Sudipto Shankar Dasgupta, Sunnyvale, CA (US); Mayoor Rao, Sunnyvale, CA (US); Gopinath Srungarapu, Bangalore (IN); Vivek Sinha, Bangalore (IN); Swaminathan Natarajan, Bangalore (IN); Sairam Yeturi, Secunderabad (IN)

(73) Assignee: INFOSYS LIMITED, Bangalore (IN)

( * ) Notice: Subject to any disclaimer, the term of this patent is extended or adjusted under 35 U.S.C. 154(b) by 0 days.

(21) Appl. No.: 15/795,115

(22) Filed: Oct. 26, 2017

(65) Prior Publication Data
US 2018/0349576 A1 Dec. 6, 2018

(30) Foreign Application Priority Data
Jun. 6, 2017 (IN) .............................. 201741019803

(51) Int. Cl.
| H04L 9/08 | (2006.01) |
| G06F 21/12 | (2013.01) |
| H04L 9/32 | (2006.01) |
| H04L 9/14 | (2006.01) |

(52) U.S. Cl.
CPC .......... *G06F 21/121* (2013.01); *H04L 9/0819* (2013.01); *H04L 9/0863* (2013.01); *H04L 9/14* (2013.01); *H04L 9/3226* (2013.01); *H04L 9/3228* (2013.01); *G06F 2221/0711* (2013.01); *G06F 2221/0753* (2013.01); *H04L 2209/603* (2013.01)

(58) Field of Classification Search
CPC ....... H04L 9/0863; H04L 9/3228; H04L 9/14; H04L 9/0819; H04L 9/3226; H04L 2209/603; G06F 21/121; G06F 2221/0711; G06F 2221/0753
See application file for complete search history.

(56) References Cited

U.S. PATENT DOCUMENTS

| 7,536,725 | B2 | 5/2009 | Raciborski | |
| 8,639,922 | B2* | 1/2014 | Phatak | G06F 21/34 713/156 |
| 8,868,915 | B2* | 10/2014 | Counterman | G06F 21/6281 713/176 |
| 9,232,067 | B2* | 1/2016 | Leigh | H04M 3/563 |
| 9,811,644 | B1* | 11/2017 | Ahmed | H04W 4/021 |
| 2004/0117628 | A1 | 6/2004 | Colvin | |
| 2004/0225894 | A1 | 11/2004 | Colvin | |

(Continued)

*Primary Examiner* — Mohammad A Siddiqi
(74) *Attorney, Agent, or Firm* — Troutman Pepper Hamilton Sanders LLP (Rochester)

(57) ABSTRACT

A method and system for authenticating software licenses of a software includes a request for a software authentication received from one or more software subscribers and one or more electronic licenses distributed between one or more software vendors and the one or more software subscribers. Further, one or more tokens are validated through an authentication engine at a delivery packet delivered to the software subscriber. A license key associated with each validated token is generated and distributed through a licensing engine. The software is initiated to be enabled through the license key.

12 Claims, 9 Drawing Sheets

(56) References Cited

U.S. PATENT DOCUMENTS

| | | | |
|---|---|---|---|
| 2005/0278259 A1* | 12/2005 | Gunaseelan | G06Q 10/10 705/59 |
| 2007/0033649 A1* | 2/2007 | Henriksen | G06F 21/34 726/20 |
| 2007/0198421 A1* | 8/2007 | Muller | G06F 21/10 705/52 |
| 2007/0233782 A1 | 10/2007 | Tali | |
| 2008/0240447 A1* | 10/2008 | Zhu | H04L 9/3271 380/279 |
| 2008/0244754 A1* | 10/2008 | Curren | G06F 21/105 726/27 |
| 2009/0006259 A1* | 1/2009 | Hsi | G06F 21/105 705/59 |
| 2009/0183001 A1* | 7/2009 | Lu | G06F 21/10 713/168 |
| 2010/0250389 A1* | 9/2010 | Augustin | G06F 21/10 705/26.1 |
| 2013/0031607 A1* | 1/2013 | Aditya | G06F 21/121 726/3 |
| 2014/0344942 A1* | 11/2014 | Headley | G06F 21/121 726/26 |
| 2015/0349960 A1* | 12/2015 | Bagley | H04L 9/3242 713/168 |
| 2016/0162897 A1* | 6/2016 | Feeney | G06Q 20/4014 705/71 |
| 2017/0093920 A1* | 3/2017 | Ducatel | H04L 63/08 |
| 2018/0034641 A1* | 2/2018 | Tiwari | H04L 63/0807 |
| 2018/0077174 A1* | 3/2018 | Hebert | H04L 63/1416 |

\* cited by examiner

CRYPTOGRAPHIC MECHANISMS FOR SOFTWARE SETUP USING TOKEN-BASED TWO-FACTOR AUTHENTICATION

FIELD OF TECHNOLOGY

The present disclosure relates to methods and systems for authenticating software licenses. More particularly, two-factor token-based authentication for software installation.

BACKGROUND

Software license key delivery has historically been based on a so-called "trust" model in which a user (i.e., licensee) may be presumed to be honest and trustworthy. Also, the user is expected to abide by the compliance needs of a license. In the world of software, the importance of authentication cannot be overstated—mainly because it plays such a central role and touches so many different systems. Software installation process involves download and software setup by customers, authentication of right parties of a software vendor to a software subscriber may be important.

Despite nuances and varieties of methods present, very few have been able to evolve past being a point solution for a specific situation. While unprotected software tokens have been criticized for an inability to protect the token from brute-force attacks, secured software credentials are able to provide the cost and scalability benefits companies expect, with the strong protection they require.

SUMMARY

Disclosed are a method and/or a system for authenticating software licenses of a software.

In one aspect, a method to authenticate software licenses of a software. The method includes receiving one or more requests for a software authentication from one or more software subscribers and distributing one or more electronic licenses between one or more software vendors and the one or more software subscribers. Further, one or more tokens is validated through an authentication engine at a delivery packet delivered to the software subscriber. A license key associated with each validated token is generated and distributed through a licensing engine to the one or more software subscribers. The software is initiated to be enabled at the one or more software subscribers through the license key.

In another aspect, a system for authenticating software licenses of a software includes a computer network, one or more servers and one or more client machines. One or more requests for a software authentication from one or more software subscribers is received at the one or more servers from the one or more client machines through the computer network. The one or more servers distributes one or more electronic licenses between one or more software vendors associated with the server and the one or more software subscribers associated with the client machine. One or more tokens is validated through an authentication engine at a delivery packet delivered to the software subscriber associated with the client machine. A license key is generated at the one or more servers with each validated token. The license key is distributed through a licensing engine to the one or more software subscribers associated with the client machine and the software at the one or more software subscribers is initiated to be enabled through the license key.

The methods and systems disclosed herein may be implemented in any means for achieving various aspects, and may be executed in a form of a machine-readable medium embodying a set of instructions that, when executed by a machine, cause the machine to perform any of the operations disclosed herein. Other features will be apparent from the accompanying drawings and from the detailed description that follows.

BRIEF DESCRIPTION OF THE DRAWINGS

The embodiments of the present invention are illustrated by way of example and not as limitation in the figures of the accompanying drawings, in which like references indicate similar elements and in which.

Other features of the present embodiments will be apparent from the accompanying drawings and from the detailed description that follows.

DETAILED DESCRIPTION

Example embodiments, as described below, may be used to provide a method, an apparatus and/or a system of authenticating software licenses of a software. Although the present embodiments have been described with reference to specific example embodiments, it will be evident that various modifications and changes may be made to these embodiments without departing from the broader spirit and scope of the various embodiments.

Figure 1:
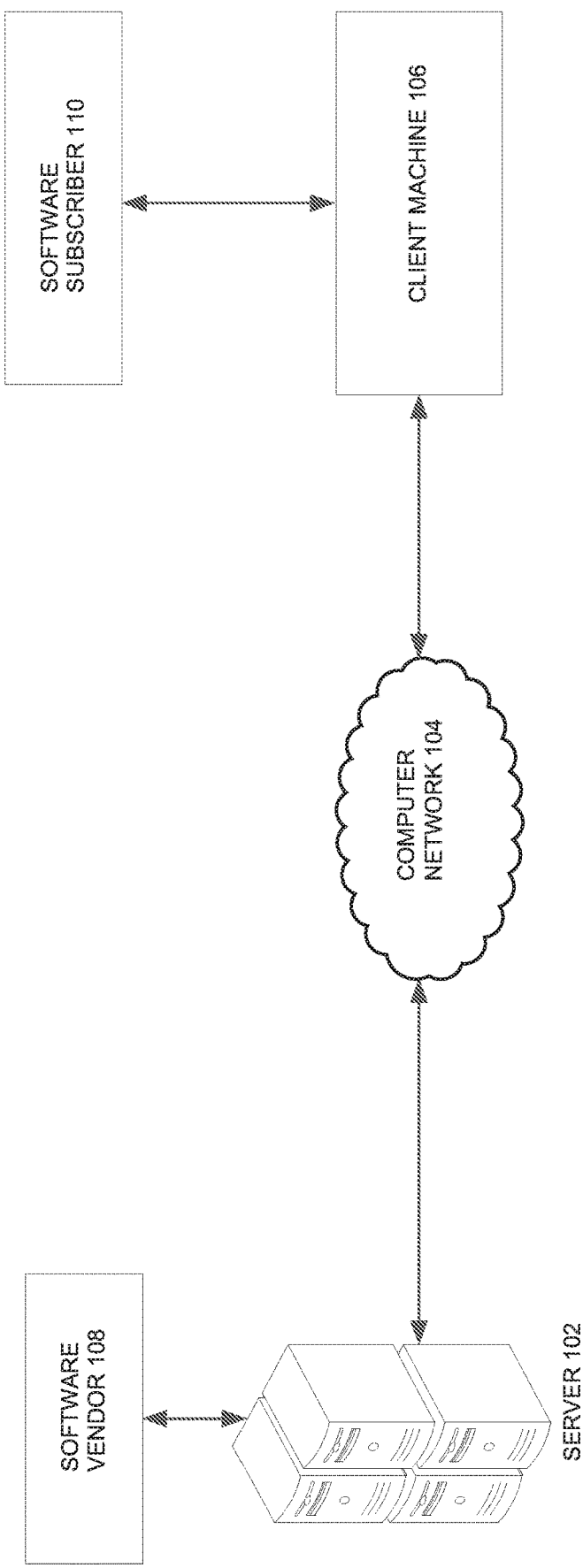
FIG. 1 illustrates a system to authenticate software licenses of a software, according to one embodiment.

FIG. 1 illustrates a system to authenticate software licenses of a software, according to one or more embodiments. The system for authenticating software licenses of a software includes a computer network 104, one or more servers 102 and one or more client machines 106. In one or more embodiments, the one or more client machines 106 may also be referred as subscriber machines. One or more requests for a software authentication from one or more software subscribers is received at the one or more servers 102 from the one or more client machines 106 through the computer network 104. The one or more servers 102 distributes one or more electronic licenses between one or more software vendors 108 associated with the server 102 and the one or more software subscribers 110 associated with the client machine 106. One or more tokens is validated through an authentication engine at a delivery packet delivered to the software subscriber 110 associated with the client machine 106. A license key is generated at the one or more servers 102 with each validated token. The license key is distributed through a licensing engine to the one or more software subscribers 110 associated with the client machine 106 and the software at the one or more software subscribers 110 is initiated to be enabled through the license key.

In one or more embodiments, a secure system and method for software setup is disclosed herein. The system and method may provide confidence to a vendor that a software delivery is being complied with, while also assisting the software subscriber's compliance with the license.

In one or more embodiments, a software subscriber may be associated with one or more subscriber machines.

In one or more embodiments, computer software licenses are electronically issued as one-time encrypted token that may be distributed in one-to-one correlation with an individual software subscriber and traced to a software vendor. A co-relation may be established between the software subscriber and the software vendor.

In one or more embodiments, the system may include an authentication module for token validation located at a software setup module being delivered to the software subscriber. The authentication module may accept the one-time encrypted token delivered along with the software to the customer to authenticate and further initiate to enable software setup.

In one or more embodiments, when an organization and/or a software subscriber wants a software license, the organization may send a software download request (and an appropriate fee) to a software vendor. The software vendor may create a software delivery pack containing a one-time encrypted token to initiate request for licensing the software setup. The encrypted token prevents the software license from being tampered and installed on non-authorized hardware. Further, the software vendor may assign a unique token to the software subscriber and deliver the unique token separately.

In one or more embodiments, software setup may entail an authentication module to verify a token applied on a software delivered by decrypting the token. The authentication module may conduct validation checks against the token if the token has been used previously against software deliveries across a software warehouse. Alternatively, if the token is valid the software setup may commence. The software vendor may maintain an inventory of encrypted tokens issued to prevent duplication of licenses that have been purchased.

In one or more embodiments, along with an authenticated and approved token, the customer may request a license key. For each valid token there may be a single license key. A licensing module may be responsible for distributing encrypted software license keys applicable for a software pack for the valid token released to individual clients. In case a license key is already generated for the valid token, the system does not provide a new license key; however the licensing module may allow reissue of the same license that was previously issued. The reissue allows safe recovery licenses when the licenses are lost and/or in case of failed activation of the licenses due to hardware issues.

In one or more embodiments, a token may be an encrypted key provided to valid software subscribers. The token may be provided so that the software subscribers may request for a license key to key into the software to start working on the software. License key may be used to initiate enablement of the software.

In one or more embodiments, a license authentication module on the software may derive the license information by establishing a trust relationship with a client and then initiating a query. Once an encrypted token available with the customer is entered, the license authentication module may grant a software activation by generating a license key.

In one or more embodiments, the system provides a secure and automated mechanism for software subscribers to obtain license in a secure way with token-based two-factor authentication.

In one or more embodiments, a two-factor authentication may be used to protect the interest of licensors. Through the two-factor authentication, only an authorized customer may be eligible to download a software, and software setup is complete by the authorized customer.

Software licensing may include "shrink wrap", "online", and "site" licenses. Software licensing may notice unscrupulous users making multiple copies of the software code and install the software on more computers than the license allows. Yet, software vendors cannot begin to monitor abuses because the abuses of license occur in privacy of a home or a company. Thus, software industry loses a large percentage of revenues each year simply due to illegitimate use of software by licensees. The loss does not even account for the problems of overseas pirating.

Figure 2:
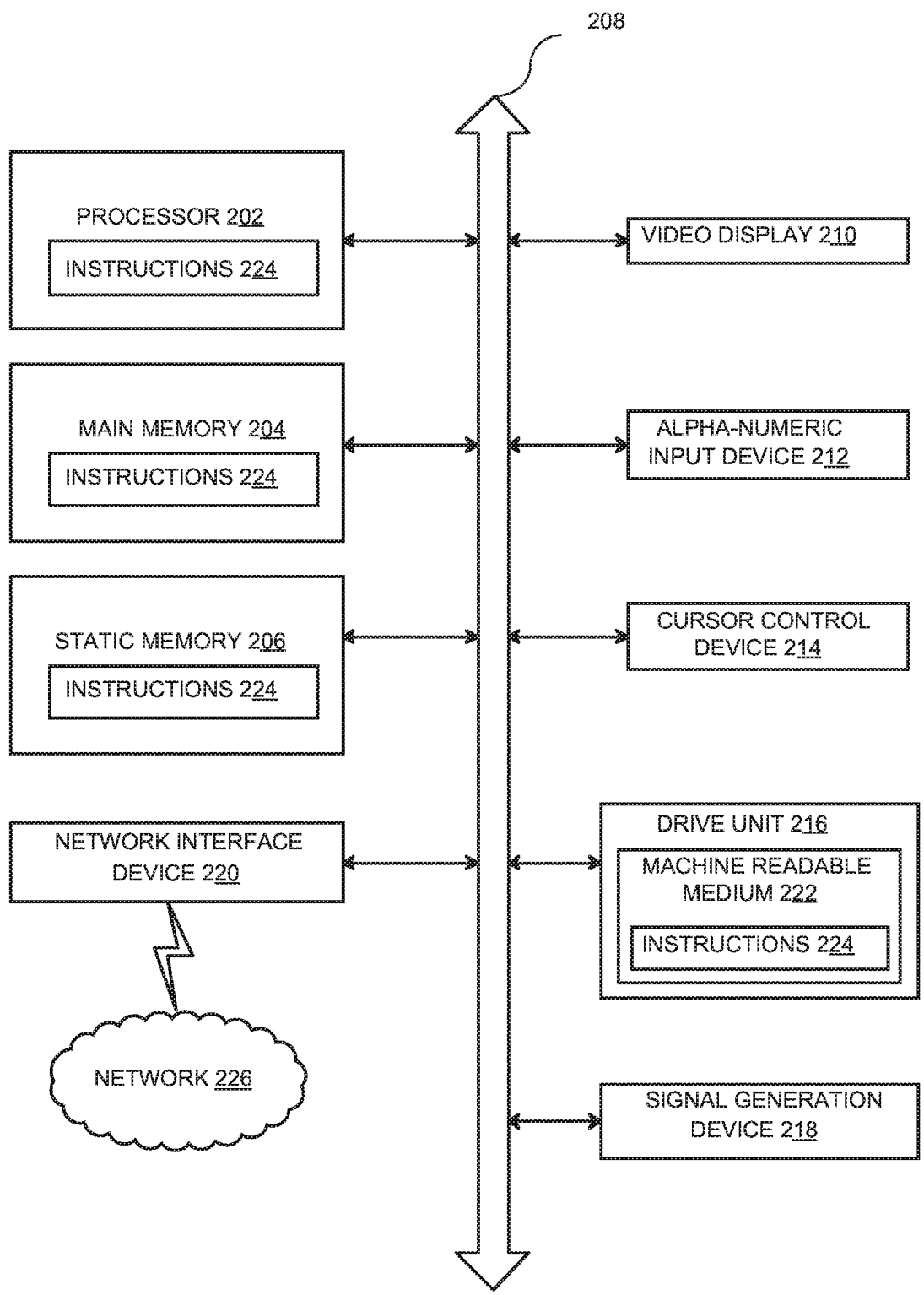
FIG. 2 is a diagrammatic representation of a data processing system capable of processing a set of instructions to perform any one or more of the methodologies herein, according to one embodiment.

FIG. 2 is a diagrammatic representation of a data processing system capable of processing a set of instructions to perform any one or more of the methodologies herein, according to an example embodiment. FIG. 2 shows a diagrammatic representation of machine in the example form of a computer system 200 within which a set of instructions, for causing the machine to perform any one or more of the methodologies discussed herein, may be executed. In various embodiments, the machine operates as a standalone device and/or may be connected (e.g., networked) to other machines.

In a networked deployment, the machine may operate in the capacity of a server and/or a client machine in server-client network environment, and or as a peer machine in a peer-to-peer (or distributed) network environment. The machine may be a personal-computer (PC), a tablet PC, a cellular telephone, a web appliance, a network router, switch and or bridge, an embedded system and/or any machine capable of executing a set of instructions (sequential and/or otherwise) that specify actions to be taken by that machine. Further, while only a single machine is illustrated, the term "machine" shall also be taken to include any collection of machines that individually and/or jointly execute a set (or multiple sets) of instructions to perform any one and/or more of the methodologies discussed herein.

The example computer system includes a processor 202 (e.g., a central processing unit (CPU) a graphics processing unit (GPU) and/or both), a main memory 204 and a static memory 206, which communicate with each other via a bus 208. The computer system 200 may further include a video display unit 210 (e.g., a liquid crystal displays (LCD) and/or a cathode ray tube (CRT)). The computer system 200 also includes an alphanumeric input device 212 (e.g., a keyboard), a cursor control device 214 (e.g., a mouse), a disk drive unit 216, a signal generation device 218 (e.g., a speaker) and a network interface device 220.

The disk drive unit 216 includes a machine-readable medium 222 on which is stored one or more sets of instructions 224 (e.g., software) embodying any one or more of the methodologies and/or functions described herein. The instructions 224 may also reside, completely and/or at least partially, within the main memory 204 and/or within the processor 202 during execution thereof by the computer system 200, the main memory 204 and the processor 202 also constituting machine-readable media.

The instructions 224 may further be transmitted and/or received over a network 226 via the network interface device 220. While the machine-readable medium 222 is shown in an example embodiment to be a single medium, the term "machine-readable medium" should be taken to include a single medium and/or multiple media (e.g., a centralized and/or distributed database, and/or associated caches and servers) that store the one or more sets of instructions. The term "machine-readable medium" shall also be taken to include any medium that is capable of storing, encoding and/or carrying a set of instructions for execution by the machine and that cause the machine to perform any one or more of the methodologies of the various embodiments. The term "machine-readable medium" shall accordingly be taken to include, but not be limited to, solid-state memories, optical and magnetic media, and the like. The term "machine-readable medium" does not refer to signals.

Figure 3:
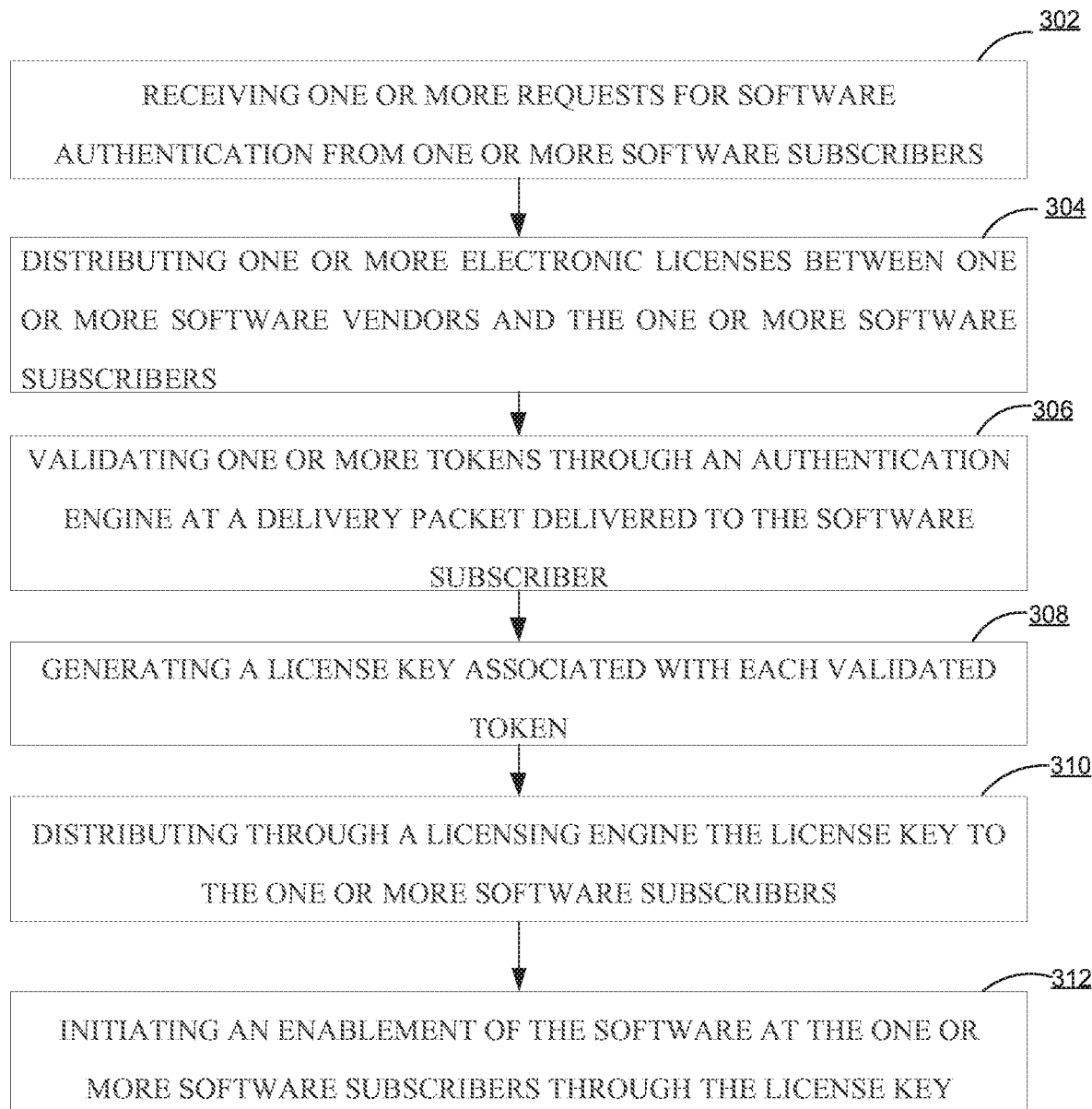
FIG. 3 is a process flow diagram detailing the operations of a method to authenticate software licenses of a software, according to one embodiment.

FIG. 3, is a process flow diagram detailing the operations of a method to authenticate software licenses of a software. The method includes receiving one or more requests for a software authentication from one or more software subscribers 302 associated with one or more subscriber machines and distributing one or more electronic licenses between one or more software vendors and the one or more software subscribers 304. Further, one or more tokens is validated through an authentication engine at a delivery packet delivered to the software subscriber 306. A license key associated with each validated token is generated 308 and distributed through a licensing engine to the one or more software subscribers 310. The software is initiated to be enabled at the one or more software subscribers through the license key 312.

In an ever-evolving business world that is as active on the software as it is in brick and mortar, having effective authentication technology for its existence has gone from a luxury to a necessity. And, as high-profile stories about compromised license continue to see the light of day, software vendors need to ensure that authentication solutions are not only resistant to attacks, but also easy-to-use, flexible and cost-effective.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

In one or more embodiments, a client computer may install a download manager program. In other embodiments, the functionality of the download manager program could be integrated into the operating system; web browser, content player, or other application software; or a browser script, applet or plug-in. Upon successful authentication, a server may be notified such that delivery is confirmed.

Figure 4:
FIG. 4 illustrates the steps involved in transmitting an encrypted token, according to one embodiment.

FIG. 4 is a block diagram indicating a relationship between a software licensor and a software subscriber, according to one embodiment. The Software licensor 402 may interact with the software subscriber 406 though an encrypted token 404 in order to authenticate a software install.

Figure 5:
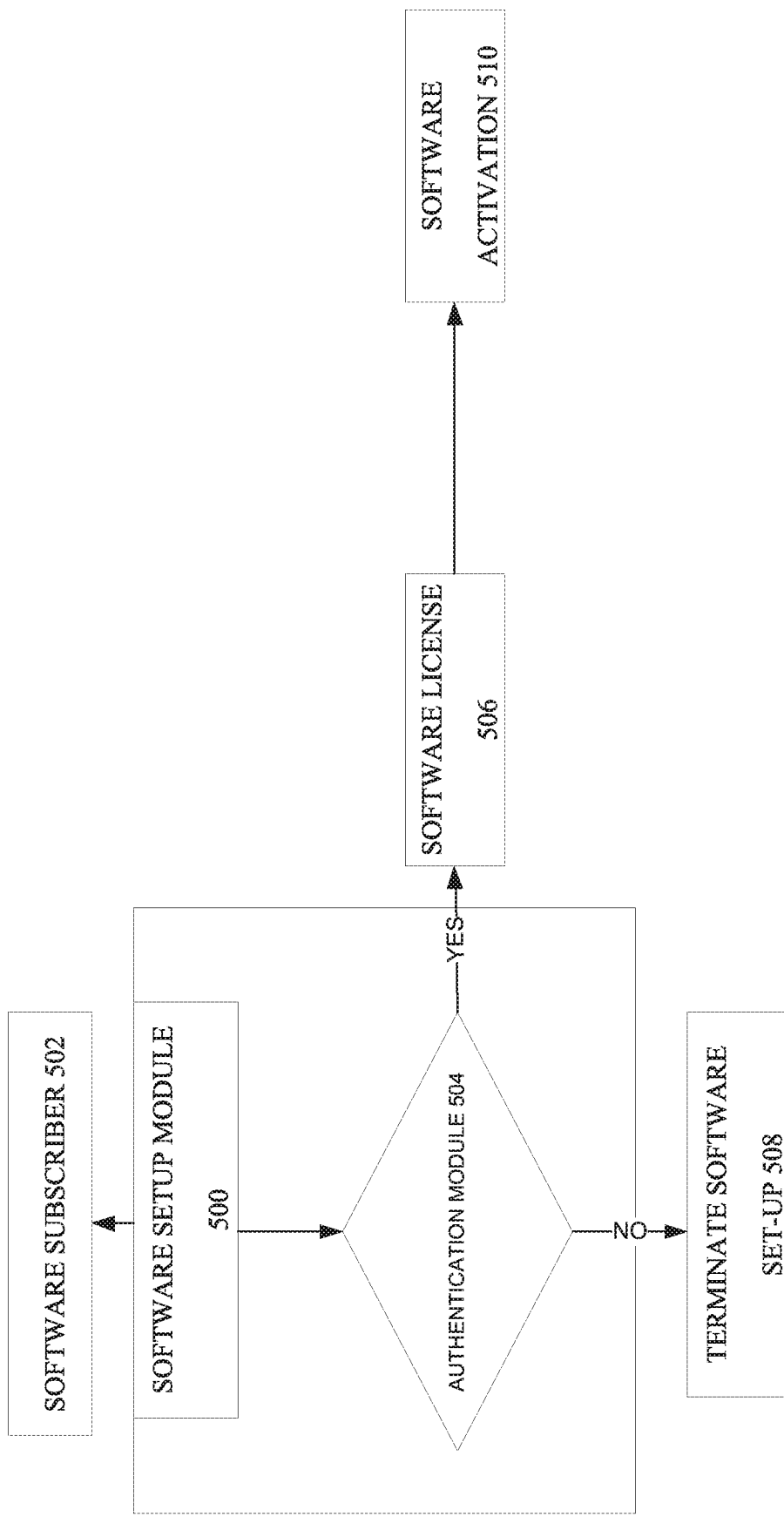
FIG. 5 illustrates a flow chart to software activation, according to one embodiment.

FIG. 5 is a flow diagram depicting the various steps in software activation, according to one embodiment. A software subscriber 502 may invoke a software setup module 500 in association with an authentication module 504 to authenticate a software installation. On positive authentication, the authentication module 504 may share a software license 506 for software activation 510. On failure to authenticate through the authentication module 504, a terminate software set-up engine 508 may be invoked.

Figure 6:
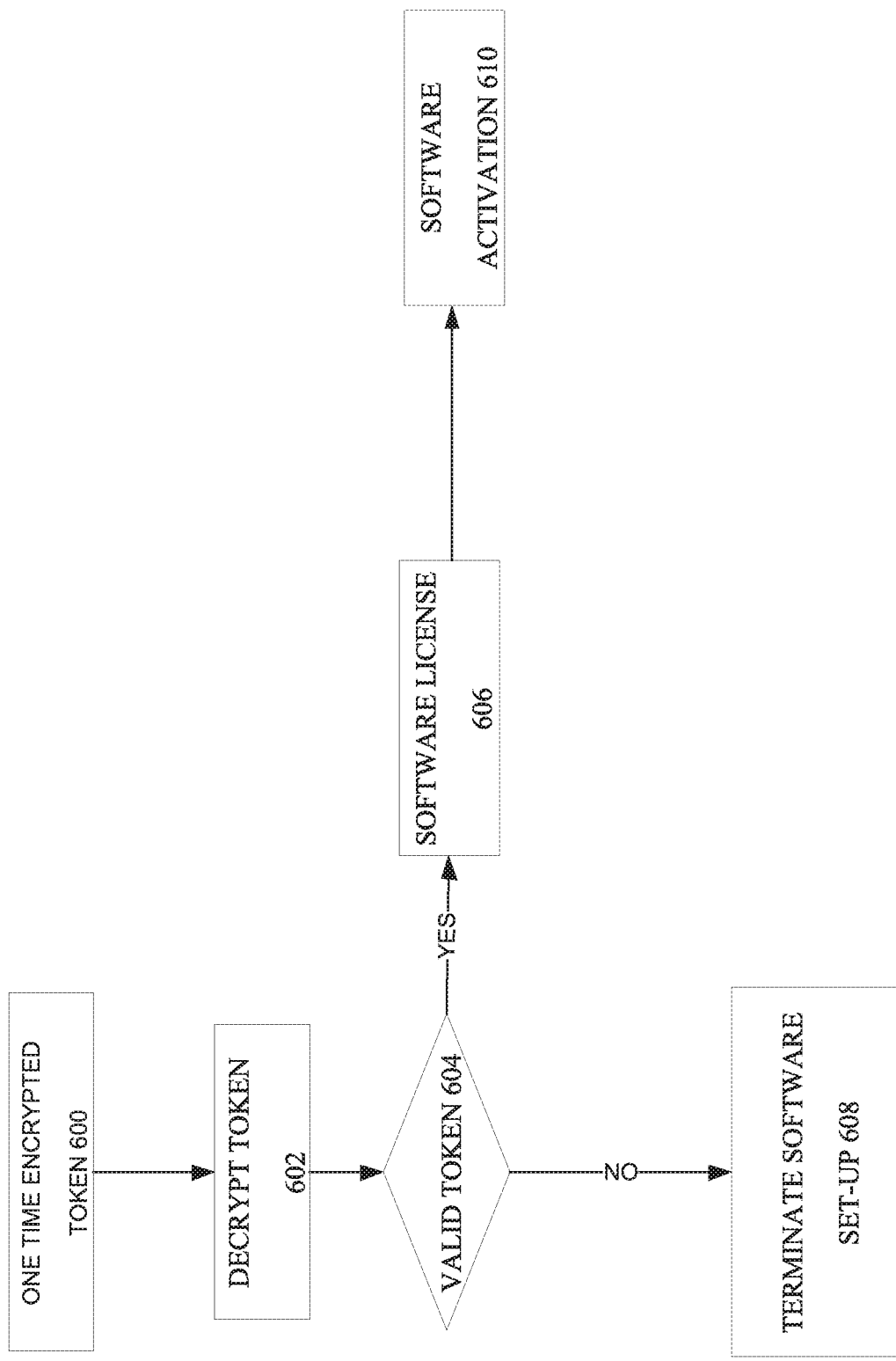
FIG. 6 illustrates the steps involved in token validation, according to one embodiment.

FIG. 6 is a flow diagram depicting a means of software activation, according to one embodiment. A one-time encrypted token 600 is decrypted 602 to check for validity of the token 604. The token on being valid, a software license 606 is shared to activate software activation 610. The token on being invalid, a terminate software set-up engine is invoked 608.

Figure 7:
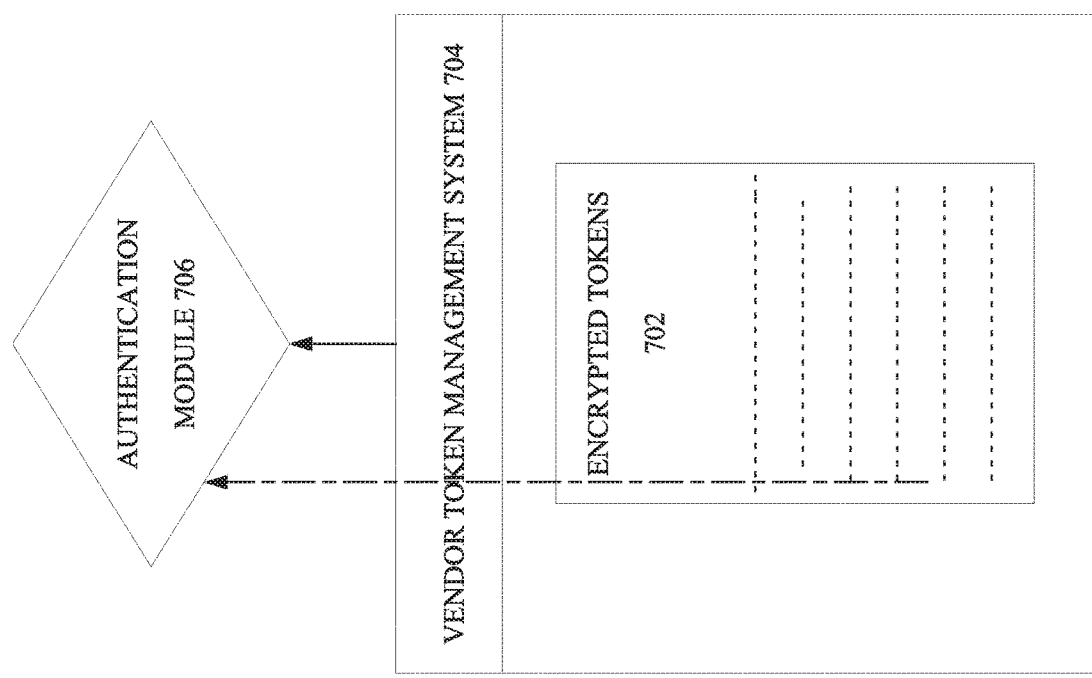
FIG. 7 illustrates the steps involved in vendor token management, according to one embodiment.

FIG. 7 depicts a vendor token management system, according to one embodiment. The vendor token management system 704 is associated with one or more encrypted token 702. The one or more encrypted tokens 702 may be shared with an authentication module 706.

Figure 8:
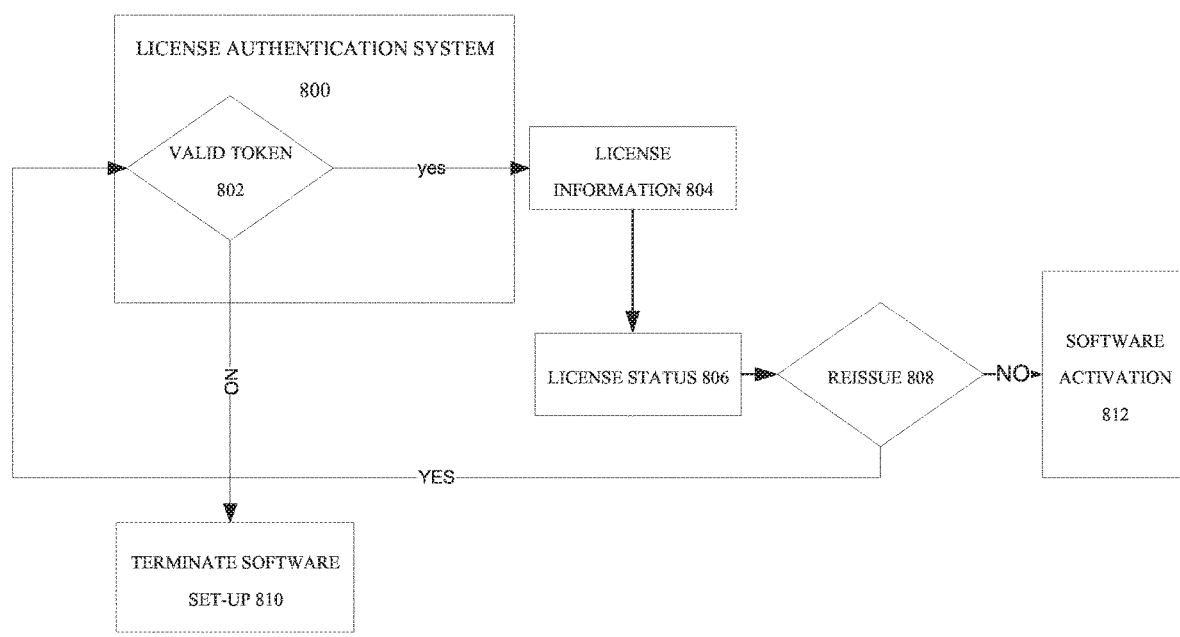
FIG. 8 is a flow chart depicting the various steps of token management through a license authentication module, according to one embodiment.

FIG. 8 depicts a license authentication system, according to one embodiment. The license authentication system 800 may be associated with a token validity check 802. The token on being valid, license information 804 and license status 806 may be shared with a license reissue engine 808. The license reissue engine 808 may check for a need to reissue the license based on the license status 806. On finding the need to reissue the license, the license reissue engine 808 may reissue a license to the license authentication system 800. On finding no need to reissue the license, the license reissue engine 808 may request software activation 812.

The token on being invalid, a command to terminate software set-up is generated 810.

Figure 9:
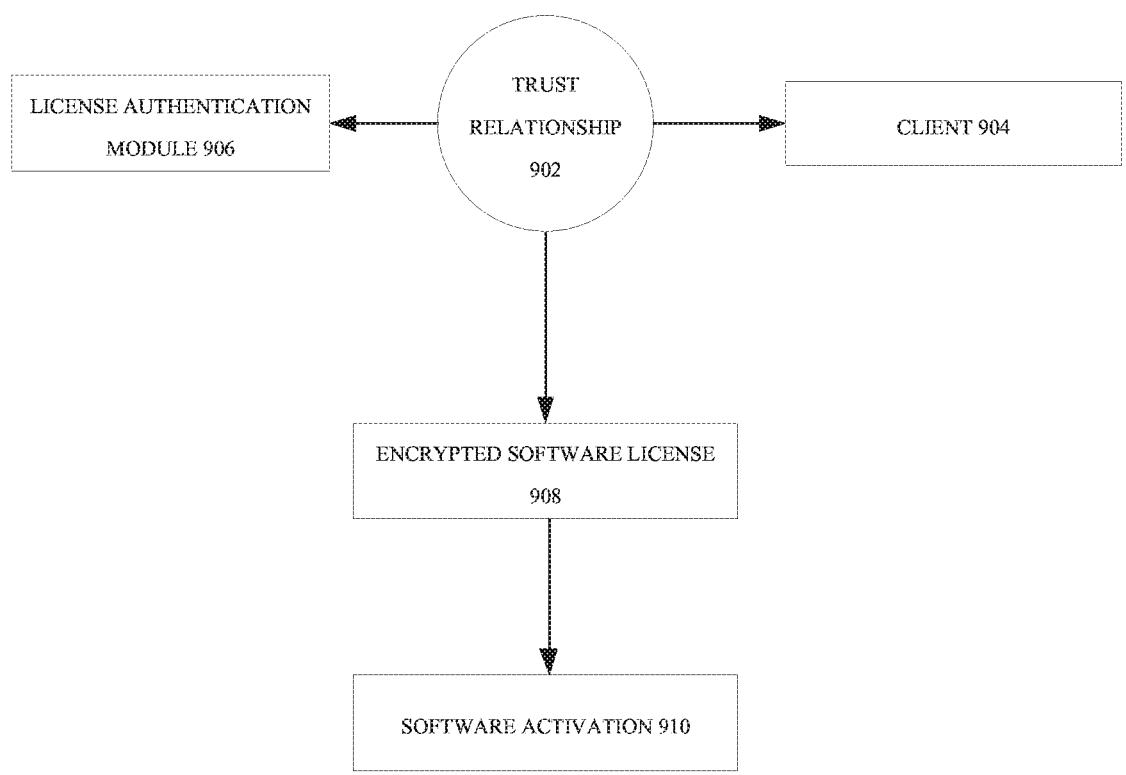
FIG. 9 is a flow chart depicting a trust relationship, according to one embodiment.

FIG. 9 depicts a trust relationship between a client and license authentication module, according to one embodiment. The trust relationship 902 between the client 904 and the license authentication module 906 leads to generation of an encrypted software license 908 and software activation 910.

Two-factor authentication systems augment a delivered level of security with respect to single-factor authentication systems based on static passwords, by providing security against theft and replay of static passwords. Tokens are a cost-effective way of realizing two-factor authentication.

In one or more embodiments, an apparatus comprising a cryptographic mechanism for software setup using token-based two-factor authentication and an access control device further comprises a program resident in a memory, the program may be configured to receive one or more requests for a software authentication from one or more software subscribers and distribute one or more electronic licenses between one or more software vendors and the one or more software subscribers. The program further validates one or more tokens through an authentication engine at a delivery packet delivered to the software subscriber. A license key associated with each validated token may be generated and distributed through a licensing engine to the one or more software subscribers. The software enablement may be initiated at the one or more software subscribers through the license key.

In one or more embodiments, an apparatus comprising a cryptographic mechanism for software setup using token-based two-factor authentication and an access control device further comprises a program resident in a memory. The apparatus may be a virtualized computer platform, with different components of the software executing in different virtual machines, which are supported by the software. A virtual machine (VM) may be an emulation of a computer system or client machine and/or subscriber machine. The virtual machine (also termed full virtualization VM) may provide a substitute for a client machine. The virtual machine may a provide functionality needed to execute entire operating systems.

In one or more embodiments, the method and system may include reporting where the software was stored to a location away from a client computer associated with the software subscriber.

In one or more embodiments, validating the token further comprises determining a look ahead value used for comparison of one or more of a cryptographic key and a value determined using the cryptographic key.

In one or more embodiments, authenticating the token using the cryptographic key further may include receiving a user name.

In one or more embodiments, receiving the user name further comprises receiving the user name from a memory.

In one or more embodiments, the method and system may include a log included in the memory, the log configured to maintain a count of failed authentication attempts.

In one or more embodiments, the cryptographic key may comprise a one-time password.

In one or more embodiments, the program is further configured to determine if the token matches another token retrieved from the memory.

Although the present embodiments have been described with reference to specific example embodiments, it will be evident that various modifications and changes may be made to these embodiments without departing from the broader spirit and scope of the various embodiments. For example, the various devices and modules described herein may be enabled and operated using hardware circuitry, firmware, software or any combination of hardware, firmware, and software (e.g., embodied in a machine readable medium). For example, the various electrical structure and methods may be embodied using transistors, logic gates, and electrical circuits (e.g., application specific integrated (ASIC) circuitry and/or in Digital Signal Processor (DSP) circuitry).

In addition, it will be appreciated that the various operations, processes, and methods disclosed herein may be embodied in a machine-readable medium and/or a machine accessible medium compatible with a data processing system (e.g., a computer devices), and may be performed in any order (e.g., including using means for achieving the various operations). The medium may be, for example, a memory, a transportable medium such as a CD, a DVD, a Blu-ray™ disc, a floppy disk, or a diskette. A computer program embodying the aspects of the exemplary embodiments may be loaded onto the retail portal. The computer program is not limited to specific embodiments discussed above, and may, for example, be implemented in an operating system, an application program, a foreground or background process, a driver, a network stack or any combination thereof. The computer program may be executed on a single computer processor or multiple computer processors.

Moreover, as disclosed herein, the term "computer-readable medium" includes, but is not limited to portable or fixed storage devices, optical storage devices and various other mediums capable of storing, or containing data.

Accordingly, the specification and drawings are to be regarded in an illustrative rather than a restrictive sense.

What is claimed is:

1. A method comprising;
receiving, by a computing device, a request for software authentication from a client machine of a software subscriber;
distributing, by the computing device, an electronic license between a software vendor and the client machine of the software subscriber based on the received request for the software authentication, wherein the electronic license comprises software responsive to the request and a token configured to interact with an authentication engine at the client machine for one or more validation checks;
generating, by the computing device, a license key in response to a received notification of the validation of the token by the authentication engine at the client machine; and
distributing, by the computing device, the generated license key to the client machine of the software subscriber, wherein the distributed license key is configured to initiate enablement of the software at the client machine.

2. The method as set forth in claim 1 wherein the token is a one-time encrypted token.

3. The method as set forth in claim 1 wherein the token is further configured to interact with the authentication engine at the client machine for the one or more validation checks comprising a determination if the token has previously been used.

4. The method as set forth in claim 1 further comprising:
reissuing, by the computing device, the generated token in response to a received notification of the validation of the token by the authentication engine at the client machine and an issue with the enablement of the software at the client machine.

5. A non-transitory machine readable medium having stored thereon instructions comprising machine executable code which when executed by at least one machine causes the machine to:
receive a request for software authentication from a client machine of a software subscriber;
distribute an electronic license between a software vendor and the client machine of the software subscriber based on the received request for the software authentication, wherein the electronic license comprises software responsive to the request and a token configured to interact with an authentication engine at the client machine for one or more validation checks;
generate a license key in response to a received notification of the validation of the token by the authentication engine at the client machine; and
distribute the generated license key to the client machine of the software subscriber, wherein the distributed license key is configured to initiate enablement of the software at the client machine.

6. The medium as set forth in claim 5 wherein the token is a one-time encrypted token.

7. The medium as set forth in claim 5 wherein the token is further configured to interact with the authentication engine at the client machine for the one or more validation checks comprising a determination if the token has previously been used.

8. The medium as set forth in claim 4 wherein the instructions further comprise machine executable code which when executed by at least one machine causes the machine to:
reissue the generated token in response to a received notification of the validation of the token by the authentication engine at the client machine and an issue with the enablement of the software at the client machine.

9. A computing device comprising:
a memory containing non-transitory machine readable medium comprising machine executable code having stored thereon instructions for managing workload within a storage system; and
a processor coupled to the memory, the processor configured to execute the machine executable code to cause the processor to:
receive a request for software authentication from a client machine of a software subscriber;
distribute an electronic license between a software vendor and the client machine of the software subscriber based on the received request for the software authentication, wherein the electronic license comprises software responsive to the request and a token configured to interact with an authentication engine at the client machine for one or more validation checks;
generate a license key in response to a received notification of the validation of the token by the authentication engine at the client machine; and
distribute the generated license key to the client machine of the software subscriber, wherein the distributed license key is configured to initiate enablement of the software at the client machine.

10. The device as set forth in claim 9 wherein the token is a one-time encrypted token.

11. The device as set forth in claim 9 wherein the token is further configured to interact with the authentication engine at the client machine for the one or more validation checks comprising a determination if the token has previously been used.

12. The device as set forth in claim 9 wherein the processor is further configured to execute the machine executable code to further cause the processor to:
reissue the generated token in response to a received notification of the validation of the token by the authentication engine at the client machine and an issue with the enablement of the software at the client machine.

* * * * *